J. D. Davis,
Pipe Tongs.
No. 98,747. Patented Jan. 11, 1870.
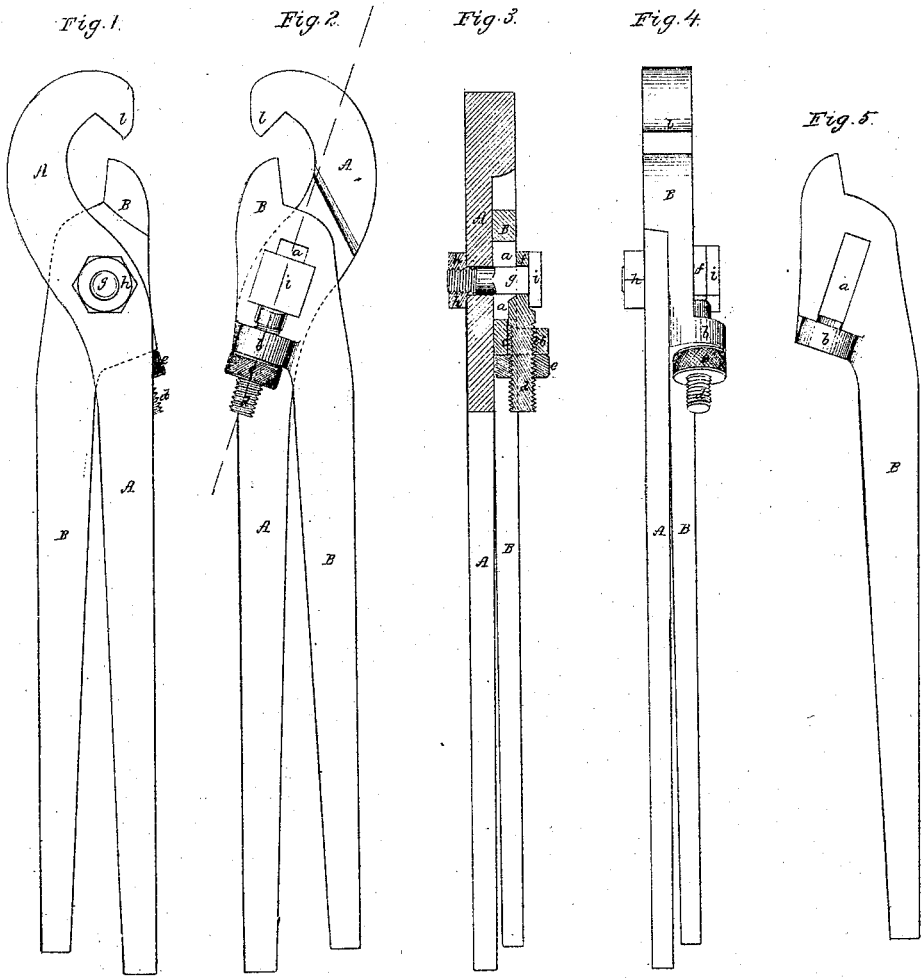
Witnesses.
S. N. Piper.
J. R. Snow.
Jonathan D. Davis
by his attorney
N. May

United States Patent Office.

JONATHAN DUNLAP DAVIS, OF FITCHBURG, MASSACHUSETTS.

Letters Patent No. 98,747, dated January 11, 1870.

IMPROVEMENT IN PIPE-TONGS.

The Schedule referred to in these Letters Patent and making part of the same.

*To all persons to whom these presents may come:*

Be it known that I, JONATHAN DUNLAP DAVIS, of Fitchburg, of the county of Worcester, and State of Massachusetts, have invented a new and useful Improvement in Pipe-Tongs; and do hereby declare the same to be fully described in the following specification, and represented in the accompanying drawings, of which—

Figures 1 and 2 are side elevations,

Figure 3, a longitudinal section, and

Figure 4, an edge elevation of my improved pipe-tongs.

In such drawing—

A denotes the hooked jaw-lever, and B, the tooth jaw-lever, they being arranged, relatively to each other, in manner as represented.

A slot, A, is made through the tooth jaw-lever, as shown more particularly in Figure 5, which is a side view of it.

The said jaw-lever is also provided with a shoulder-piece, $b$, erected on or projected from it, at one extremity of the slot.

A round hole, $c$, is bored through this shoulder-piece and the contiguous part of the lever, to receive a screw, $d$, which extends through the said hole, and has a milled nut, $e$, screwed on it.

The screw $d$ has a flat head, $f$, through which a screw-bolt or pivot, $g$, is extended.

The shank of the bolt goes through the slot and the hook jaw-lever, and receives a nut, $h$, the head of the bolt being shown at $i$.

Figure 6 is a side view of the bolt or pivot, such pivot being applied to the hook jaw-lever, so as to be capable of freely revolving in it.

The tooth jaw-lever slides freely on the pivot or bolt, in a direction toward the hook $l$, of the hooked jaw-lever.

The milled nut is insulated from each jaw-lever, whereby the tooth jaw-lever can be moved on the screw, independently of the nut, which is not the case in the pipe-tongs described in the United States patent, No. 48,017, as in such tongs the nut is fitted into recesses made in the lever, which is slotted, and consequently the lever cannot be moved without the nut being moved with it. These recesses greatly weaken the lever, and render it liable to break while in use.

It will be seen, that in the construction of my pipe-tongs, I have made a different arrangement of its operative parts, whereby I am not only enabled to adjust the jaws with greater facility, but have dispensed with the said recesses for holding the nut. Furthermore, my pipe-tongs have other important advantages.

I do not claim the pipe-tongs as represented in the aforesaid patent, nor do I claim the solid screw and fulcrum as described therein, as I do not use such, as my screw and pivot are in separate pieces, the front going through the head of the screw. This enables me to readily insert the screw through the shoulder-piece, which could not be accomplished were the screw and pivot in one solid piece, or conjoined. In my arrangement, the nut, having a shoulder-piece, is disposed between the pivot and the nut, whereby the tooth jaw-lever is rendered easily movable on the screw, and, while at work, takes a bearing on the nut.

I claim the pipe-tongs, consisting of the jaws A and B, lug $b$, slot $a$, nut $o$, and the fulcrum or bolt $g$, and nut $h$, constructed and arranged as described.

JONATHAN DUNLAP DAVIS.

Witnesses:
R. H. EDDY,
J. R. SNOW.